(12) United States Patent
Ledingham

(10) Patent No.: US 6,250,841 B1
(45) Date of Patent: *Jun. 26, 2001

(54) SPLICE SLEEVE FOR GUIDE RAILS

(75) Inventor: Stuart J. Ledingham, Coto de Caza, CA (US)

(73) Assignee: Valu Engineering, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,759

(22) Filed: Nov. 23, 1999

Related U.S. Application Data

(63) Continuation of application No. 08/934,861, filed on Sep. 22, 1997, now abandoned.

(51) Int. Cl.[7] ...................................................... F16B 2/06
(52) U.S. Cl. ...................... 403/306; 403/312; 403/374.3; 198/836.1; 198/836.3
(58) Field of Search .................................... 403/306, 309, 403/310, 312, 373, 374.3; 198/836.1, 836.3

(56) References Cited

U.S. PATENT DOCUMENTS

| 229,670 | 7/1880 | Carrick . | |
|---|---|---|---|
| 930,870 | 8/1909 | Lewis . | |
| 3,059,589 | 10/1962 | Schreyer . | |
| 4,958,725 | * 9/1990 | Meade et al. ...................... | 198/836.1 |
| 5,492,218 | * 2/1996 | Falkowski ......................... | 198/836.3 |
| 5,533,826 | * 7/1996 | Cairns ............................. | 198/836.3 X |
| 5,626,221 | * 5/1997 | Ledingham ......................... | 198/836.3 |
| 5,676,239 | * 10/1997 | Mason ............................... | 198/836.1 |
| 5,701,991 | * 12/1997 | Helmetsie .......................... | 198/836.3 |
| 5,782,339 | * 7/1998 | Drewitz ............................. | 198/836.3 |
| 5,803,687 | * 9/1998 | Ledingham .................... | 198/836.3 X |
| 5,896,980 | * 4/1999 | Butler ............................... | 198/836.3 |
| 5,927,480 | * 7/1999 | McCaffrey et al. .............. | 198/836.3 |
| 6,053,654 | * 4/2000 | Ledingham ......................... | 403/306 |

FOREIGN PATENT DOCUMENTS

| 335904 | 3/1959 | (CH) . |
|---|---|---|
| 489838 | 8/1938 | (GB) . |

* cited by examiner

*Primary Examiner*—David E. Bochna
(74) *Attorney, Agent, or Firm*—Knobbe, Martens, Olson & Bear LLP

(57) ABSTRACT

A guide rail splice sleeve device provides for adjustable housing, gripping, and connecting of sequential guide rails. The device includes an elongated central member, a first and second tension bar detachably connected to the central member at opposite ends thereof, and fastening elements for securely connecting the first and second tension bars independently to the central member. Advantageously the central member and tension bars have integral flanges to aid in support of the guide rails. The independent connection of each tension bar to the central member permits sequential guide rail segments to be gripped or adjusted independently of the other. Additionally, the sleeve may include a hand tightening device so that the fastening elements may be adjusted without the need for tools. Also, the sleeve may include an extension for spanning any gap between non-abutting ends of adjacent guide rail segments connected by the sleeve.

16 Claims, 8 Drawing Sheets

SPLICE SLEEVE FOR GUIDE RAILS

RELATED APPLICATION

This is a continuation of prior application Ser. No. 08/934,861, filed on Sep. 22, 1997, now abandoned.

BACKGROUND OF THE INVENTION

1. Field of the Invention

The present invention relates in general to guide rail assemblies used in assembly line and conveyor belt systems and, in particular, to a means for adjustably housing, gripping and connecting sequential conveyor guide rails.

2. Description of the Related Art

Clamps are commonly used to grip and connect guide rails which direct the travel of articles along a predetermined path of an assembly line or conveyor system. The articles are conveyed on a belt or track during the processing and packaging procedures of a typical manufacturer. Dependable fixation and alignment of the guide rails is important to ensure manufacturing efficiency and to minimize damage of the articles from inappropriate contact with the guide rails. Guide rail length is customized to conveyor length by the sequential alignment and connection of guide rail segments.

Early guide rail housing, gripping, and connecting means were characterized by a cross bar that incorporated a clamping device, as illustrated in FIG. 1. Abutting guide rails were then connected and secured to the cross bar by the clamping device. Clips and other retention means were also used to secure abutting guide rails. An advantage of incorporating a clip with a nut and bolt clamping device is that the nut is more easily rotated onto the bolt without causing simultaneous rotation of the bolt. That is, integral bolts eliminate the need to grasp the bolt in order to prevent its rotation while rotating the nut onto the bolt shaft. However, a disadvantage of clips formed with or without the bolt is that they tend to rotate out of position about the pivot point formed by the bolt in the cross bar, thereby causing misalignment of the guide rail in the conveyor system.

The device shown in FIG. 2 is exemplary of a recent development in the guide rail housing, gripping and connecting field. This device comprises upper and lower L-shaped cross bars of equal length. The upper and lower cross bars are inversely aligned to form a C-shaped groove section wherein abutting guide rails are housed and secured. The upper and lower cross bars are detachably connected by a nut and bolt retention device to allow adjustment of the guide rails.

However, the prior art devices all have significant deficiencies. Specifically, once abutting guide rail segments are connected, any subsequent alteration of either guide rail segment (due to setup, modification, replacement, etc.) is difficult because, when the retention means is loosened, both guide rail segments become loose. This results in at least three loose parts. Therefore, the task of altering a guide rail segment requires either two operators or one operator with significant difficulty and awkwardness. A second problem with the prior art resulted because the abutting guide rail segments are secured by only a single retention mechanism. Thus, whenever the single retention mechanism is loosened to alter a guide rail segment, the abutting guide rail segment is correspondingly loosened.

A need therefore exists for a means for adjustably housing, gripping and connecting sequential guide rails that is easily adjustable and does not posses the disadvantages of the prior art.

SUMMARY OF THE INVENTION

In accordance with one aspect of the present invention, there is provided a splice sleeve device for adjustably gripping first and second adjacent guide rail segments. The device incorporates individual retention means for gripping each guide rail, overcoming the deficiencies of the prior art by enabling a single of the guide rails to be loosened and adjusted while the adjacent guide rail remains securely connected to the splice sleeve.

In the preferred embodiment, the sleeve comprises an elongated central member, a first tension bar, a second tension bar, and two retention means for selectively adjusting the respective tension bars to the central member, thereby tightening or loosening the corresponding guide rails with respect thereto.

The first retention means engages the first tension bar and the central member. So connected, these members form a first guide rail channel for gripping a first guide rail segment positioned therein.

The second retention means engages the second tension bar and the central member. So connected, these members form a guide rail channel for gripping a second guide rail segment positioned therein.

The first and second guide gail retention means may be independently loosened or tightened, whereby adjustments may be made to the position of either guide rail segment independently from the other rail segment positioned therein.

Thus, the dual retention means permits an operator to loosen one tension bar in order to loosen the corresponding guide rail. The other tension bar remains undisturbed and accordingly the other sequential guide rail remains securely connected to the splice sleeve. This design enables a single operator to adjust, modify, or slide a guide rail without the above mentioned disadvantages inherent in the prior art.

As a further advantage of the sleeve of the present invention, the central member and each tension bar include flange sections. These flange sections extend from these members in the direction opposite the guide rail channels defined thereby. This arrangement permits easy access to the fastening elements connecting these members. Moreover, the flanges provide additional mass and rigidity in the direction of an applied force which further secures the guide rail segments creating a stronger hold for the guide rails.

Advantageously the provision of flanges on the central member and tension bars adds mass in the direction of force exerted by the guide rail. Thus, the added mass of the flange increases the gripping ability of the sleeve.

In one preferred embodiment the sleeve incorporates a hand tightening device with a ratcheting mechanism into the retention means so that the retention means may be tightened or loosened without the assistance of additional devices.

In another preferred embodiment, an extension rail is provided which spans a space between the first and second tension bars or guide rails positioned therein. This provides additional precision in the alignment of guide rails, eliminating any gap between adjacent guide rail ends and decreasing the likelihood that articles being transported by the conveyor system will be disrupted in their travel or damaged as a result of encountering an exposed end of one of the adjacent guide rail segments.

Further advantages and applications will become apparent to those skilled in the art from the following detailed description and the drawings referenced herein.

DETAILED DESCRIPTION OF THE PREFERRED EMBODIMENTS

Figure 1:
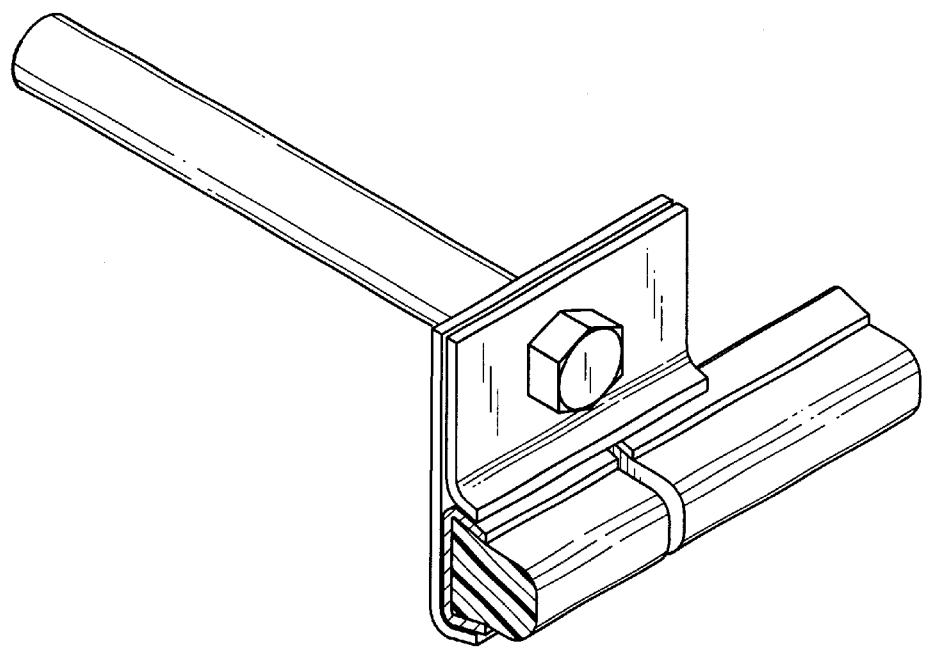
FIG. 1 is a front perspective view of a first prior art guide rail housing, gripping, and connecting device.
Figure 2:
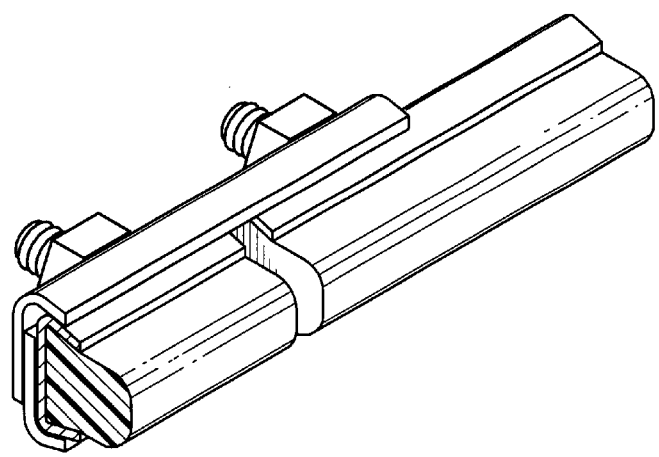
FIG. 2 is a front perspective view of a second prior art guide rail housing, gripping, and connecting device.
Figure 3:
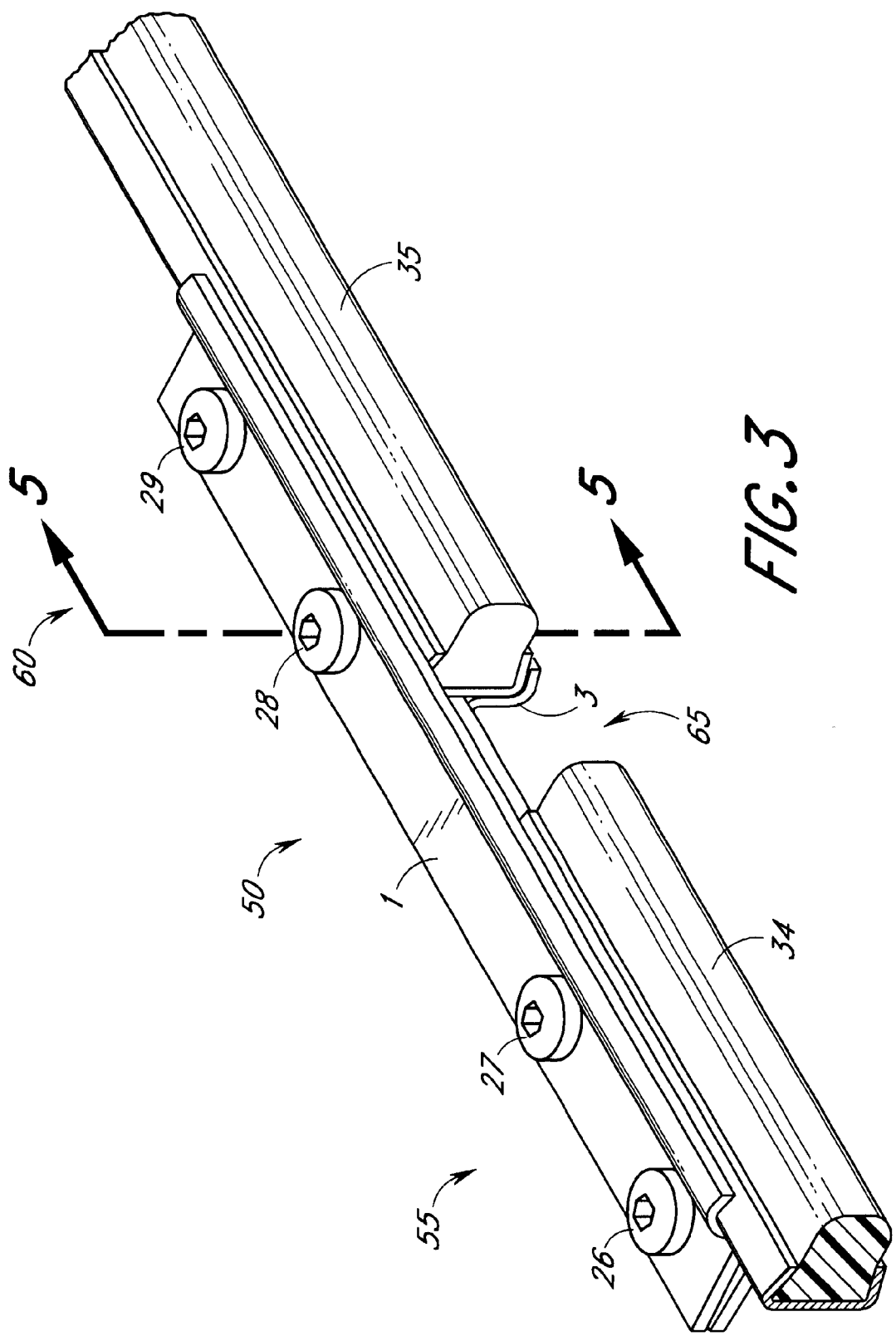
FIG. 3 is a front perspective view of a splice sleeve constructed in accordance with the teachings of the invention as connected to sequential guide rail segments.
Figure 4:
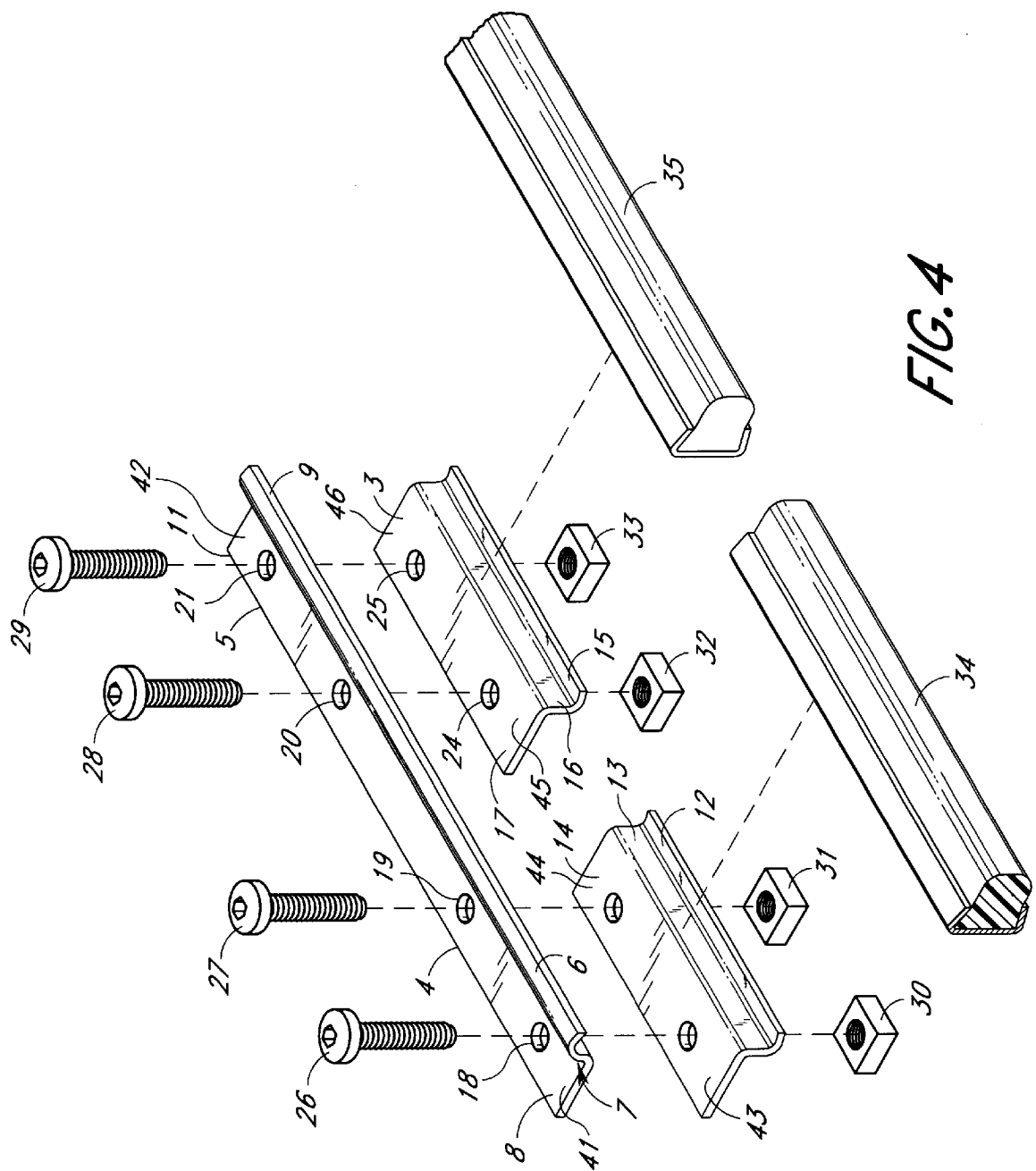
FIG. 4 is an exploded front perspective view of the splice sleeve illustrated in FIG. 3.

Referring to the drawings, and particularly to FIGS. 3 and 4 thereof, there is illustrated a guide rail splice sleeve 50 in accordance with the present invention. In general, the guide rail splice sleeve 50 is adapted to detachably receive two adjacent guide rail segments in a manner whereby either guide rail segment 30,31 may be attached, detached, adjusted, moved, or slide independent of the other segment.

Referring still to FIGS. 3 and 4, the guide rail splice sleeve 50 in accordance with the present invention preferably includes an elongated central member 1, a first tension bar detachably connected to a first end 4 of the central member 1, a second tension bar 3 detachably connected to a second, opposite end 5 of the central member 1, and two retention means 55,60 which secure the tension bars 2,3 to the central member 1 as well as tighten or loosen corresponding guide rail segments 34,35 when placed between the central member 1 and tension bars 2,3.

The sleeve 50 preferably includes an elongated central member 1. The central member 1 is constructed in a substantially stepped design, having a first or top section 6 having an edge 9, a downwardly extending second, generally vertical section 7, and a third or outwardly extending section 8 having an edge 11. An angle α of approximately 90 degrees is formed between the top section 6 and the vertical section 7. The member 1 has a first end 4 and an opposing second end 5.

The sleeve 50 includes a first tension bar 2 constructed in a substantially stepped design, having a first or bottom section 12, an upwardly extending second or vertical section 13, and a third generally horizontally extending top section 14. An angle β of approximately 80 degrees is formed between the bottom section 12 and the vertical section 13. The first tension bar 2 is preferably less than one-half the length of the central member 1 and is arranged, as described in more detail below, to be detachably connected to the first end 4 of the central member 1. When so connected, the end 43 of the first tension bar 2 and the end 41 of the central member 1 both preferably terminate along the same plane. That is, both ends are preferably flush.

The sleeve 50 includes a second tension bar 3 constructed in a similar manner as the first tension bar 2 to define a substantially stepped design, having a first or bottom section 15 and an upwardly extending second or vertical section 16, and a third, generally horizontally extending top section 17. An angle γ of approximately 80 degrees is formed between the bottom section 15 and the vertical section 16. The second tension bar 3 is preferably less than one half the length of the central member 1 and is arranged, as described in more detail below, to be detachably connected to the second end 5 of the central member 1. When so connected, the end 46 of the second tension bar 3 and the end 5 of the second end 46 of the central member 1 both preferably terminate along the same place. That is, both ends are preferably flush.

Of course, it will be easily understood by those skilled in the art that the ends 43,46 of the first and second tension bars 2,3 do not need to be flush with the ends 41,42 of the central member 1 to accomplish the purpose of the present invention. Moreover, the angles α, β, and γ may be altered to accommodate guide rails of various shapes and sizes known in the art.

The first and second tension bars 2,3 may be interchangeable and are distinguished herein only for clarity purposes. Because the tension bars 2,3 have a length which is less than one half the length of the central member 1 and one end 43,46 of each tension bar 2,3 is arranged to be flush with an end 41,42 of the central member 1, a central portion 65 is created between the interior ends 44,45 of the first and second tension bars 2,3 (see FIG. 3).

A first retention means 55 is provided for detachably securing the first tension bar 2 to the first end 4 of the central member 1. Preferably, this means includes one or more fastening devices for detachably engaging the first end 4 of the central member 1 with the first tension bar 2. This engagement is achieved by aligning holes 18,19 (see FIG. 4) extending through the horizontal section 8 of the central member 1 with holes 22,23 extending through the horizontal section 14 of the first tension bar 2.

When the holes 18,19 in the central member 1 at its first end 4 are aligned with the holes 22,23 in the first tension bar 2, a fastening device 26,27 may be passed or inserted through the aligned holes 18,19,22,23. When fastened, the end 41 of the first end 4 of the central member 1 and the end 43 of the first tension bar 2 remain preferably flush.

A second retention means 60 is similarly provided for detachably securing the second tension bar 3 to the second end 5 of the central member 1. Preferably, this means includes one or more fastening devices for detachably engaging the second end 5 of the central member 1 with the second tension bar 3. This engagement is achieved by aligning holes 20,21 in the horizontal section 8 of the central member 1 at its second end 5 with holes 24,25 through the horizontal section 17 of the second tension bar 3.

When the holes 20,21 through the second end 5 of the central member 1 are aligned with the holes 24,25 through the second tension bar 3, a fastening device 28,29 may be inserted through the holes 20,21,24,25. When fastened, the end 46 of the second end 5 of the central member 1 and the end 42 of the second tension bar 3 are preferably flush.

Of course, it will be easily understood by those skilled in the art that the ends 43,46 of the first and second tension bars 2,3 do not need to be flush with the ends 41,42 of the central member 1 to accomplish the purposes of the present invention. Similarly, the first and second tension bars 2,3 need not be in any particular order and may be interchanged. Moreover, there is no requirement that the first and second ends 4,5 of the central member 1 and the first and second tension bars 2,3 have precisely two holes. Rather, the central member 1 or the tension bars 2,3 may have one or more holes, regardless of the number of holes which the other elements (central member 1 and tension bars 2,3) have. Additionally, it is contemplated that the retention means 55,60, preferably a bolt 26,27,28,29, may be permanently affixed to either the central member 1 or the tension bars 2,3 as will be easily understood by those skilled in the art.

A first guide rail channel 70 (FIG. 70) is formed when the first tension bar 2 is secured to the central member 1 as described above. So arranged, these members 1,2 cooperate to define a channel 70 characterized by a 80 degree angle α between the top section 6 and downwardly extending vertical section 7 of the central member 1 at its first end 4, and an 80 degree angle β between the bottom section 12 and upwardly extending vertical section 13 of the first tension bar 2. More specifically, the top section of the channel 70 is formed by the top section 6 of the first end 4 of the central member 1, the bottom section of the channel 70 is formed by the bottom section 12 of the first tension bar 2, and the vertical section of the channel 70 is formed by the abutting downwardly extending vertical section 7 of the first end of the central member 1 and the upwardly extending vertical section 13 of the first tension bar 2. This arrangement also defines a back flange area formed by the bottom section 8 of the first end 4 of the central member 1 and the top section 14 of the first tension bar 2. The channel 70 thereby formed is adapted to receive a first guide rail 34.

A second guide rail channel 75 is similarly formed by the attachment of the second tension bar 3 to the central member 1 as described above. So arranged, these members 1,3 define a channel 75 characterized by an 80 degree angle α between the top section 6 and downwardly extending vertical section 7 of the second end of the central member 1 and an 80 degree angle γ between the bottom section 15 and upwardly extending vertical section 16 of the second tension bar 3. More specifically, the top section of the channel 75 is formed by the top section 6 of the second end 5 of the central member 1, the bottom section of the channel 75 is formed by the bottom section 15 of the second tension bar 3, and the vertical section of the channel 75 is formed by the abutting downwardly extending vertical section 7 of the second end 5 of the central member 1 and the upwardly extending vertical section 16 of the second tension bar 3. This arrangement also defines a back flange area formed by the bottom section 8 of the second end 5 of the central member 1 and the top section 17 of the second tension bar 3. The channel formed thereby houses the second guide rail 35.

As stated above, the two retention means 55,60 are provided for detachably securing the first and second tension bars 2,3 to the respective ends 4,5 of the central member 1. When tightened, each retention means also acts to grip and secure a guide rail segment 34,35 positioned within the channel 70,75. This gripping ability results from the interrelationship between each tension bar 2,3 and the central member 1 as will be easily understood by those skilled in the art.

Preferably, a conventional nut and bolt is used to adjust the gripping force, thus allowing selective tightening or loosening of a guide rail segment 34,35 in the sleeve 50. More specifically, in accordance with the preferred embodiment, a bolt 26,27,28,29 is passed through the horizontal or third sections 8,14,17 of the central member 1 and tension bars 2,3. A nut 30,31,32,33 is then threaded onto that portion of the bolt 26,27,28,29 extending through the sleeve 50 to its opposite side. Tightening of each bolt 26,27,28,29 creates an inwardly directed force onto the top 6, and bottom 12,15 surfaces of the channel 70,75. This force secures a guide rail 34,35 when accepted into the channel 70,75 as will be understood by those skilled in the art. Selective tightening or loosening of the bolt fastening device accordingly grips or releases the guide rail 34,35. Advantageously, the nuts 30,31,32,33 cannot spin because they abut up against the vertical sections 13,16 of the tension bars 2,3, this aids in loosening and tightening the retention means 55,60.

It may now be understood that when the fastening means are loosened, each tension bar 2,3 may move with respect to the central member 1, such that each channel 70,75 is larger than a guide rail segment 34,35 positioned therein. In this state, the segments 34,35 are readily inserted into or removed from the channel 70,75. This allows a first guide rail 34 to be adjusted, moved, or slid while a second guide rail 35 remains secure or, alternatively, the second guide rail 34 to be adjusted, moved, or slid while a first guide rail 34 remains secure. Additionally, both guide rails 34,35 may be simultaneously adjusted, moved, or slid.

Figure 5:
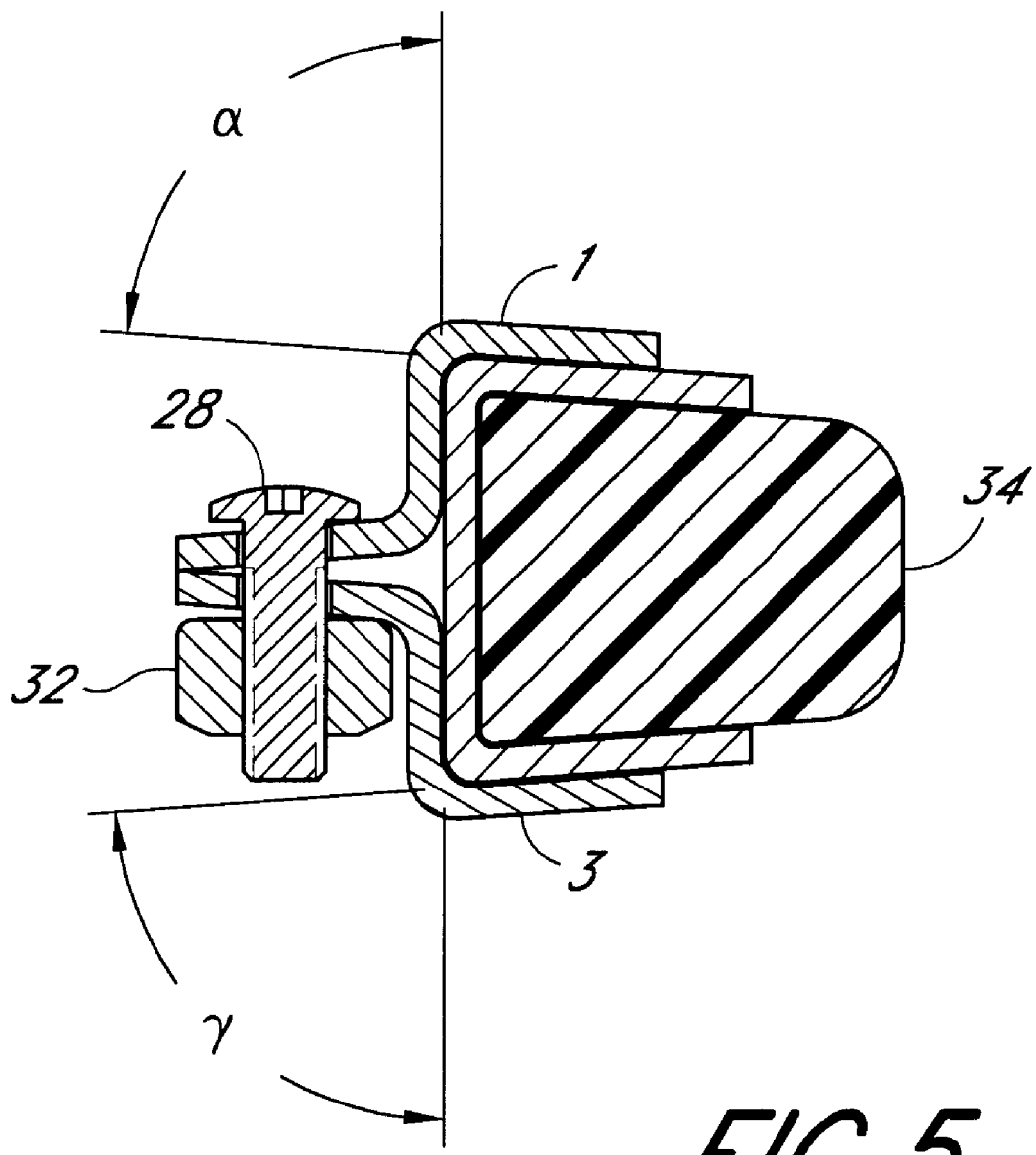
FIG. 5 is a cross sectional view of the splice sleeve illustrated in FIG. 3 taken along lines 5—5 of FIG. 3.

When, however, the fastening means are tightened (as by tightening the bolts 26,27,28,29 in the embodiment illustrated in FIGS. 3 and 4, and cross sectionally viewed in FIG. 5) the horizontal or "flange" sections 14,17 of the first and second tension bars 2,3 are brought into rigid and secure contact with the horizontal or "flange" section 8 of the central member 1. When so tightened, because the outwardly extending first portion 12,15 of each tension bar 2,3 extends upwardly to an angle of less than 90 degrees (80 degrees, approximately), this portion of the sleeve presses upwardly or "inwardly" towards the first section 6 of the central member 1, tightly squeezing and securing the guide rail segment 34,35 positioned therebetween.

As may also now be understood, the sleeve 50 of the present invention permits a user to selectively tighten or loosen the adjacent guide rail segments 34,35 independently from one another. For example, the user may loosen the retention means 55 corresponding to the first tension bar 2 and thus release a guide rail segment 34 secured in the first guide rail housing area defined in part thereby, without disturbing the secure connection of the sleeve to the second guide rail segment 35, or vice versa. Advantageously, one guide rail may thus adjust, move, or slide away from or towards another guide rail which remains secured in the sleeve.

Figure 6:
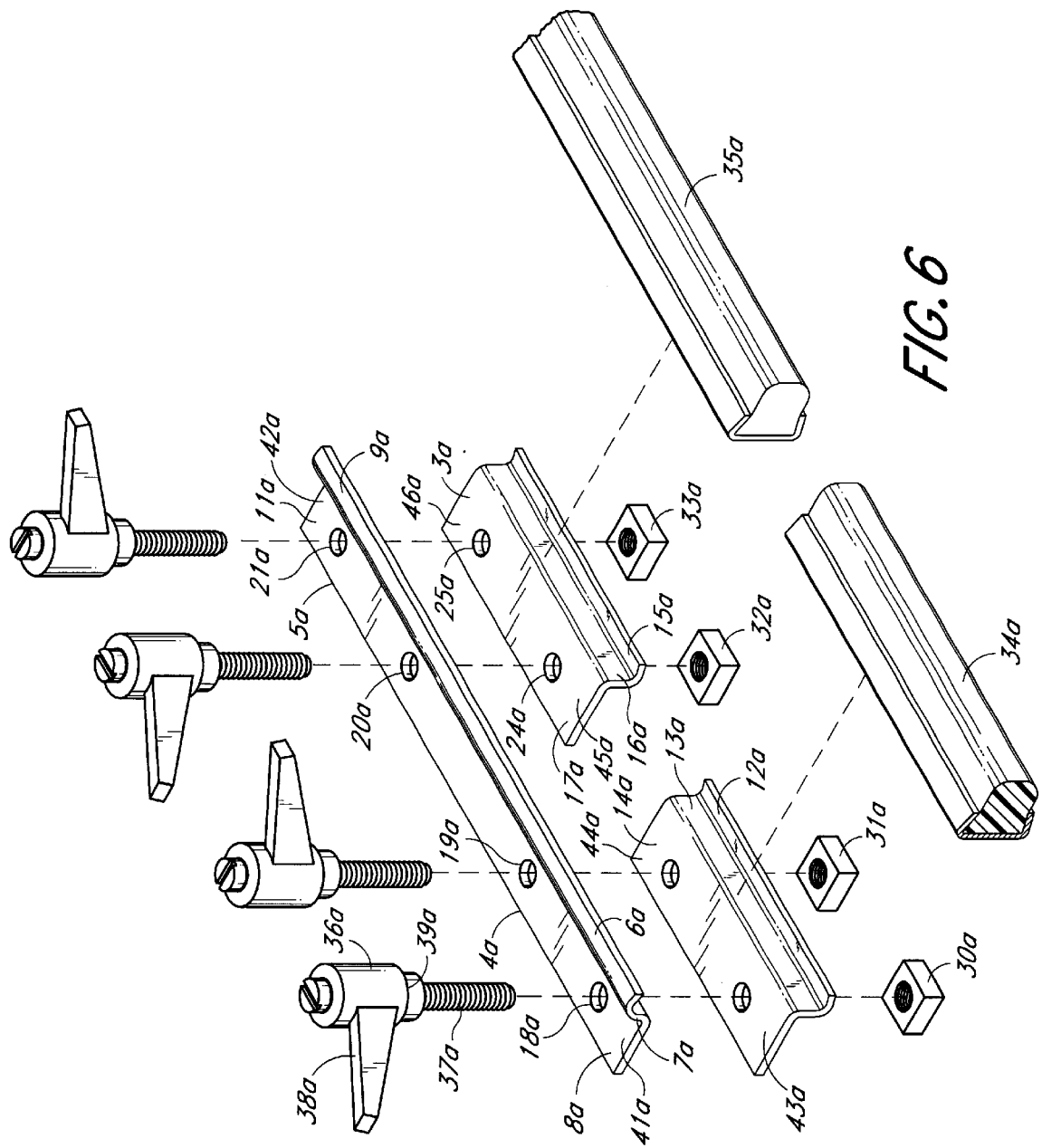
FIG. 6 is an exploded front perspective view of the splice sleeve illustrated in FIG. 4 and incorporating a hand tightening device.
Figure 7:
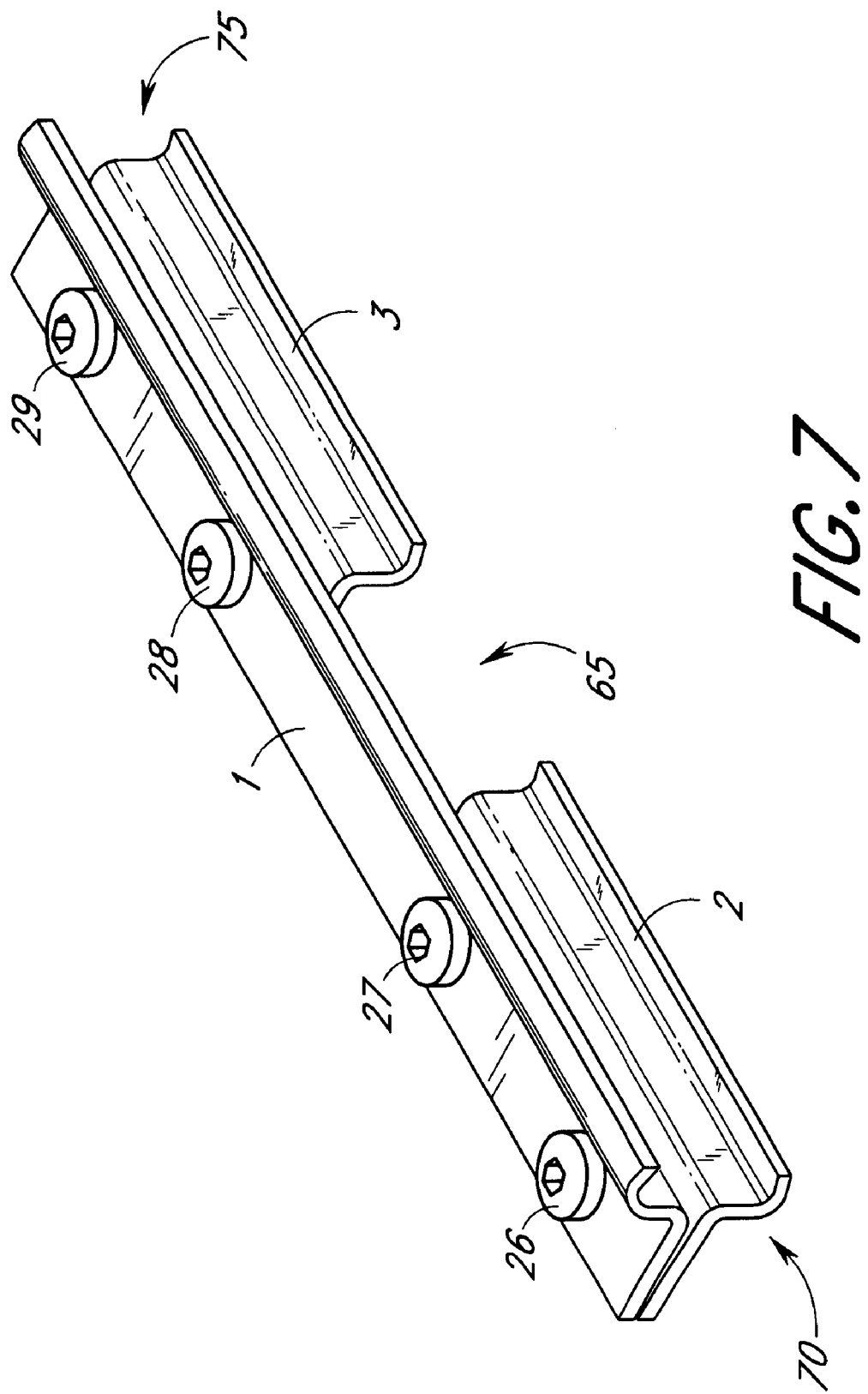
FIG. 7 is a front perspective view of the splice sleeve illustrated in FIG. 3 prior to the connection of a pair of sequential guide rails.

In accordance with a second embodiment of the present invention, and referring to FIG. 6, the sleeve 50 incorporates a hand tightening device 36a in the retention means. This embodiment of the invention is similar to that described above and illustrated in FIGS. 3–5, and as such, like reference numeral have been given to similar parts, except that an "a" designator has been appended thereto.

The hand tightening device 36a is preferably constructed of molded plastic and comprises a bolt portion 37a and a handle portion 38a. The bolt portion 37a is inserted through the flange section 8a of the central member 1a and the corresponding tension bar 2a,3a. A nut 30a threadingly engages the bolt portion 37a urges the fashion, as known in the art. Clockwise rotation of the bolt portion 37a urges the device 36a toward the nut 30a, thereby tightening the retention means, and counterclockwise rotation of the bolt portion 37a loosens the nut-bolt connection, thereby loosening the retention means. The handle portion 38a partially houses the bolt portion 37a and extends radially to form a handle by which an operator may grip and rotate the device 36a. A ratchet mechanism 39a lies between the bolt portion 37a and the handle portion 38a to allow rotation of the device 36a in confined areas.

This arrangement is advantageous since it allows a user of the guide rail splice sleeve of the present invention to make adjustments without the need for a wrench or similar tool to tighten and loosen the fastening and gripping means.

Of course, it will be easily understood by those skilled in the art that other retention means may be used other than the hand tightening device 36a to accomplish the purposes of the present invention. Moreover, the present invention contemplates interchangeable use of the hand tightening device 36a and other fastening means on a sleeve 50. That is, a sleeve 50 may incorporate one or more hand tightening devices and one or more other fastening devices such as screws and bolts.

Figure 8:
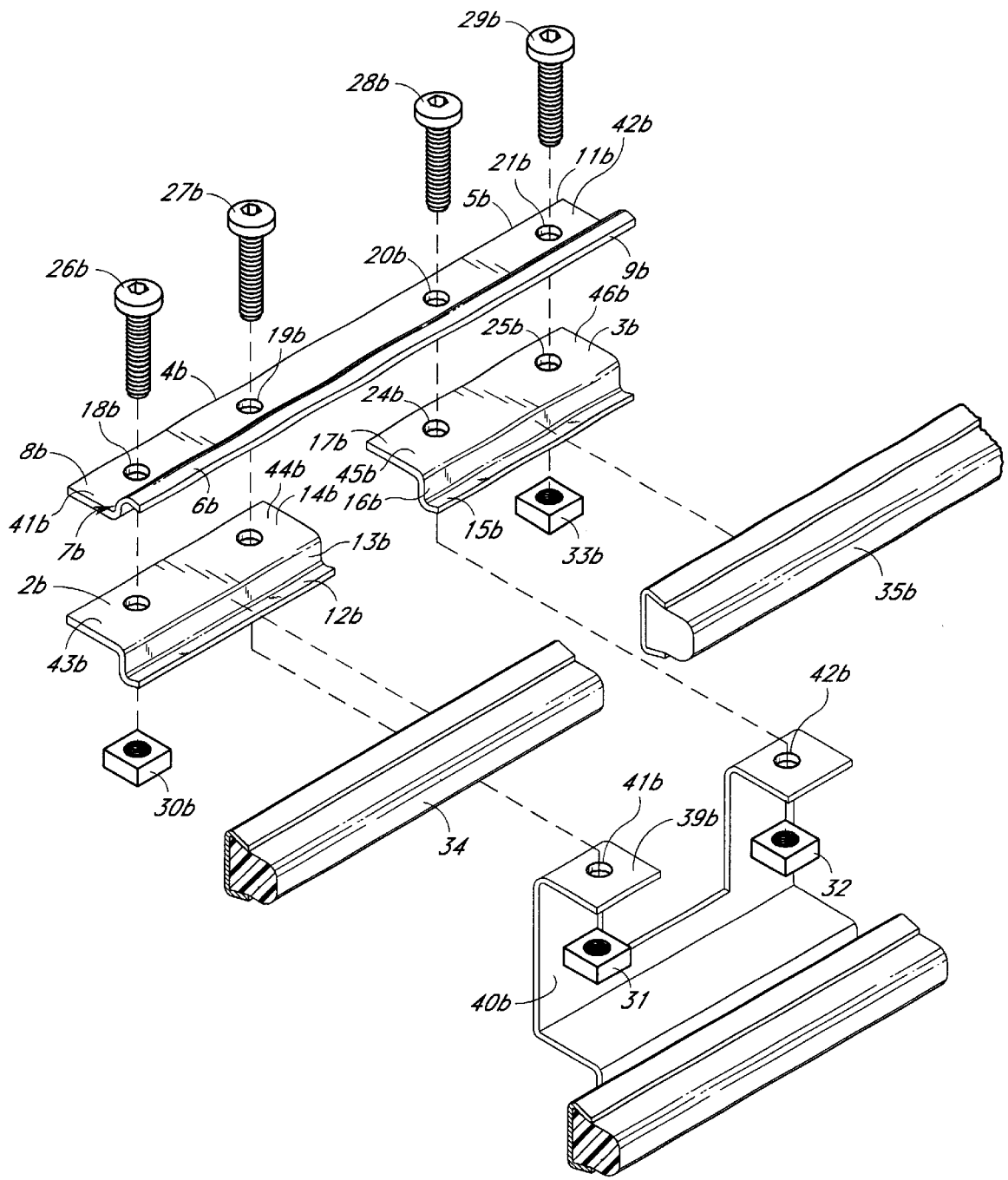
FIG. 8 is a front perspective view of the splice sleeve illustrated in FIG. 4 with an extension guide rail attached.
Figure 9:
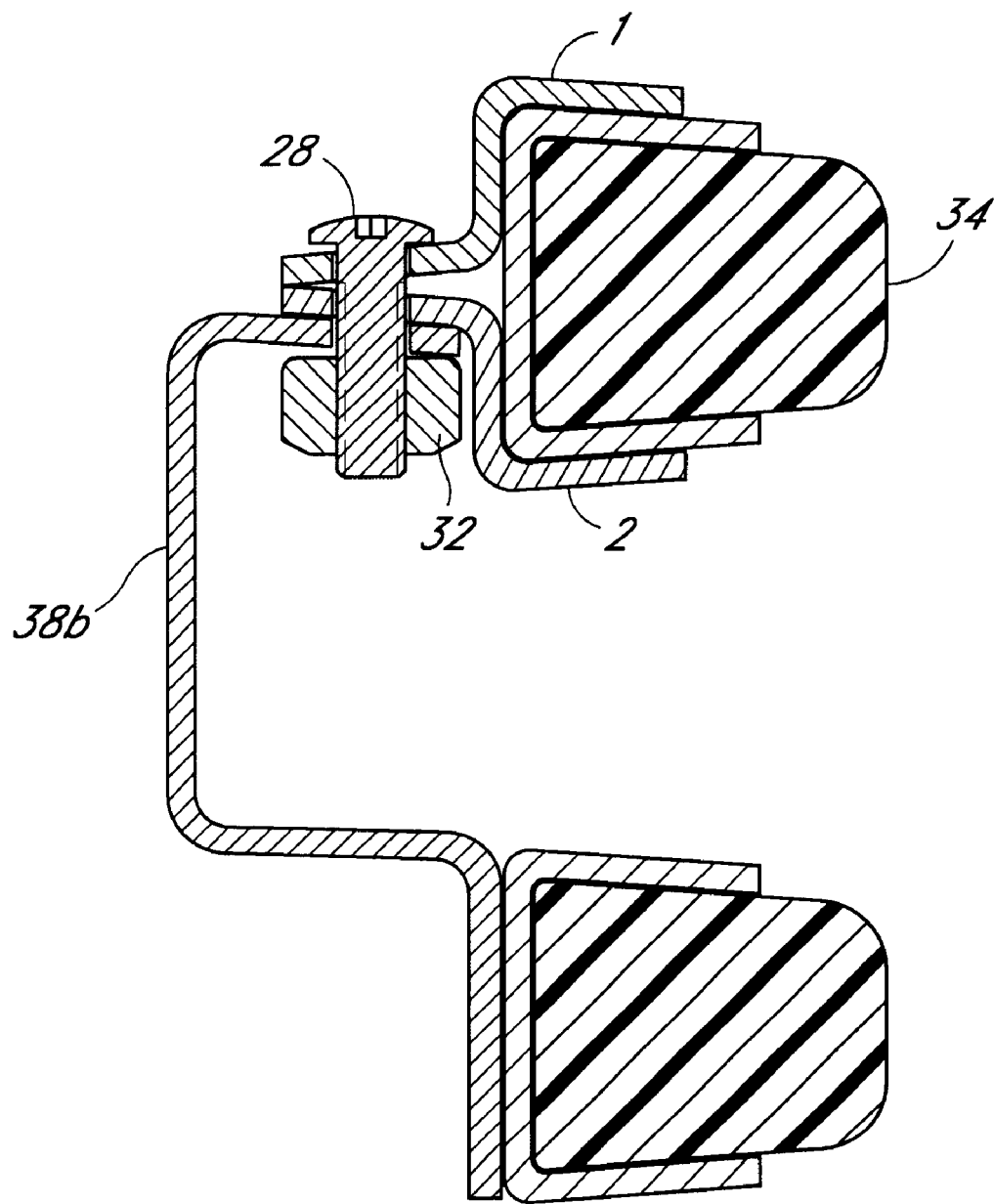
FIG. 9 is a cross sectional view of the splice sleeve illustrated in FIG. 5 with an extension guide rail attached.

Another preferred embodiment of the present invention is illustrated in FIGS. 8 and 9. This embodiment of the invention is similar to that described and illustrated above, and as such, like reference numerals have been given to similar parts, except that a "b" designator has been added thereto.

In this embodiment, the sleeve preferably incorporates an extension guide rail 40b removably secured to the central member 1b and arranged to span and gap between the first and second tension bars 2b,3b. Attachment of the extension 40b to the central member 1b is accomplished by aligning holes 41b,42b passing through a mounting portion 39b of the extension 40b with the interior holes 19b,20b in the central member 1b. When aligned, a bolt 27b,28b or similar fastener may be inserted through the holes 19b,20b,41b, 42b to secure the extension rail 40b beneath the sleeve 50b.

As may be appreciated, if the ends of two adjacent guide rail segments 34b,35b do not meet at the sleeve connection, a space exists therebetween. Items moving along a conveyor which encounter this gap may become lodged with the gap against an end of the guide rail segment. In addition, the guide rail end may damage packaging or the like.

In accordance with the present invention, the extension 40b serves as a "bridge" between spaced guide rail segments 34b,35b so that an effective continuous guide rail is provided. The extension 40b may be arranged to include a plastic guide section facing inwardly towards the items moving along the conveyor, or other arrangements similar to the guide rails currently in use as will be understood by those skilled in the art.

It is noted that while the guide rail extension 40b is preferably positioned below the sleeve 50b, it is possible to mount the extension 40b above the sleeve 50b, as long as in the particular application in which the extension is used the extension remains in a position for engagement with the items on the conveyor.

In addition, the extension 40b may have a length which is greater than the spacing between the inwardly facing ends of the tension bars 2b,3b, but the length is preferably less than the overall length of the central member 1b. In this fashion, the extension 40b serves its intended purpose even if the gap between the ends of adjacent rails is larger than the space between the tension bars 2b,3b. Generally, however, the gap between adjacent rails rarely exceeds two inches in length.

Referring to FIGS. 3 and 4, in the preferred embodiment, the members 1,2,3 are all constructed of stainless steel. Stainless steel was chosen for its strength, low cost, and ability to be easily cleaned, which are commonly required of guide rail mounting devices used in assembly line operations. The ability to be easily cleaned becomes especially important when the sleeve is used in food preparation situation. Moreover, stainless steel can be polished to a smooth surface. However, there is no requirement that stainless steel be used. Rather, other metals, plastics, composites, or other similar materials may be used depending on the requirements which are demanded of the sleeve.

In the preferred embodiment, the central member 1 is approximately eight inches in length, with a top section 6 width of approximately three eighths of an inch, a downwardly extending vertical section 7 width of approximately one quarter of an inch, and a bottom section 8 width of approximately one half of an inch. The first and second tension bars 2,3 are both approximately three inches in length with a bottom section 12,15 width of approximately three eighths of an inch, an upwardly extending vertical section 13,16 width of approximately one quarter of an inch, and a top section 14,17 width of approximately one half of an inch. The holes 18,19,20,21,22,23,24,25 located on the central member 1 and first and second tension bars 2,3 are approximately three eighths of an inch in diameter. The threaded bore through each nut 30,31,32,33 and the threaded shaft of each bolt 26,27,28,29 are also approximately three eighths of an inch in diameter and of conventional design. However, there is no requirement regarding these specifications and should be varied based upon the specific application of the sleeve 50. For example, conveyor systems utilized by large automobile parts manufacturers may tend to require larger specifications while conveyor systems utilized by small electronics manufacturers may tend to require smaller specifications.

In addition, while the fastening means described above have been described as an interengaging nut and bolt, other fasteners are contemplated. For example, the fasteners may comprise clamps or clips. Also, threaded shafts may extend from each tension bar 2,3 and be formed integrally therewith for passing through corresponding holes in the central member 1, thus eliminating the need for separate bolts and the holes through the tension bars. Alternatively, the threaded shaft may be integral with an extend from the central member 1 which will be understood by those of skill in the art.

While in the preferred embodiments the ends 41,42 of the central member 1 and an end 43,46 of each tension bar 2,3 are arranged to be flush when these members are connected, it is contemplated that the ends 41,42,43,46 are not flush. For example, the central member 1 may have its end 41,42 extend beyond the end 43,46 of either or both tension bars 2,3 connected thereto.

The embodiments illustrated and described above are provided merely in examples of the sleeve 50 constructed in accordance with the present invention. Other changes and modifications can be made from the embodiments presented herein by those skilled in the art without departure from the spirit and scope of the invention, as defined by the appended claims.

What is claimed is:

1. A splice sleeve for selectively connecting sequential first and second guide rails, comprising:
   an elongated central member for engaging a first portion of a first and a second guide rail said central member having an integral flange;
   a first tension bar having a flange for engaging a second portion of the first guide rail;
   a second tension bar having a flange for engaging a second portion of the second guide rail;
   means for detachably connecting said first tension bar flange to said central member flange whereby said central member and first tension bar cooperate to securely engage the first guide rail; and means for detachably connecting said second tension bar flange to said central member flange whereby said central member and second tension bar cooperate to securely engage the second guide rail.

2. The splice sleeve as claimed in claim 1 wherein the means for detachably connecting said first tension bar to said central member comprises at least one bolt.

3. The splice sleeve as claimed in claim 2 wherein the central member flange includes at least one hole passing therethrough for alignment with at least one hole passing through said first tension bar flange.

4. The splice sleeve as claimed in claim 1 wherein the means for detachably connecting said second tension bar to said central member comprises at least one bolt.

5. The splice sleeve as claimed in claim 3 wherein the central member flange includes at least one hole passing therethrough for alignment with at least one hole passing through said second tension bar flange.

6. The splice sleeve as claimed in claim 1 wherein said central member has a first section, a second section extending generally perpendicular to said first section, and a third section extending generally perpendicular to said second section and serving as said flange.

7. The splice sleeve as claimed in claim 1 wherein said first and second tension bars each have a first section, a second section extending generally perpendicular to said first section, and a third section extending generally perpendicular to said second section and serving as said flange.

8. The splice sleeve as claimed in claim 7 wherein, when connected, said third section of each tension bar engages said third section of said central member.

9. A splice sleeve as claimed in claim 1 wherein each means for detachably connecting includes a hand adjustable device.

10. A splice sleeve as claimed in claim 9 wherein said means for detachably connecting comprises a bolt and a threaded handle member for engagement with said bolt.

11. A splice sleeve as claimed in claim 1 further including a guide rail extension member removably connectable to said central member and spanning at least a gap between said first and second tension bars along said central member.

12. A splice sleeve for independently adjustably connecting sequential first and second guide rails, comprising:

first, second and third guide rail engaging members, each of said members having a front flange and a rear outwardly extending section, said first and second members cooperating to define a first guide rail channel in which a first guide rail may be positioned, and said first and third members cooperating to define a second guide rail channel in which a second guide rail may be positioned;

at least one retention member removably attaching said outwardly extending section of said first engaging member to said outwardly extending section of said second engaging member, thereby securing the first guide rail within said first channel; and at least one retention member removably attaching said outwardly extending section of said first engaging member to said outwardly extending section of said third engaging member, thereby securing the second guide rail within said second channel.

13. A method of adjusting a first guide rail segment in a splice sleeve while a second guide rail segment remains firmly secured in the splice sleeve, including a central member having a rear outwardly extending portion and a front flange cooperating with a first tension bar having a front flange and a rear outwardly extending portion to define a first guide rail channel and the central member cooperating with a second tension bar having a front flange and a rear outwardly extending portion to define a second guide rail channel comprising the steps of:

positioning an end portion of said first guide rail in said first guide rail channel;

positioning an end portion of said second guide rail in said second guide rail channel;

removably securing a first portion of said outwardly extending section of said central member to said outwardly extending section of said first tension bar to secure said first guide rail in said first guide rail channel; and removably securing a second portion of said outwardly extending section of said central member to said outwardly extending section of said second tension bar to secure said second guide rail in said second guide rail channel.

14. The method in accordance with claim 13 further including the step of adjusting a relative position of said first tension member with respect to said central member to disengage said first guide rail from said first tension bar and central member.

15. The method in accordance with claim 13 further including the step of adjusting a relative position of said second tension member with respect to said central member to disengage said second guide rail from said second tension bar and central member.

16. The method in accordance with claim 13 wherein each securing step comprises a fastener.

* * * * *